United States Patent [19]

Patrick

[11] 4,221,444
[45] Sep. 9, 1980

[54] CONNECTORS AND ARTICLES HAVING CONNECTORS THEREON

[75] Inventor: James F. Patrick, North Melbourne, Australia

[73] Assignee: The Universtiy of Melbourne, Victoria, Australia

[21] Appl. No.: 953,545

[22] Filed: Oct. 23, 1978

[30] Foreign Application Priority Data

Oct. 21, 1977 [AU] Australia ............................... PD2147

[51] Int. Cl.³ ........................ H05K 1/08; H01R 13/52
[52] U.S. Cl. ............................. 339/17 M; 339/59 M; 339/116 R
[58] Field of Search ............. 339/17 F, 17 LM, 17 M, 339/17 CF, 59 M, 61 M, 94 M, DIG. 3, 116 R

[56] References Cited

U.S. PATENT DOCUMENTS

| | | | |
|---|---|---|---|
| 2,655,638 | 10/1953 | Allen | 339/94 M |
| 3,307,139 | 2/1967 | Prise | 339/17 F |
| 3,721,940 | 3/1973 | Michel et al. | 339/17 F |
| 3,885,173 | 5/1975 | Lee | 339/17 CF |
| 3,998,512 | 12/1976 | Anhalt et al. | 339/59 M |
| 4,050,755 | 9/1977 | Hasircoglu | 339/17 CF |

Primary Examiner—Neil Abrams
Attorney, Agent, or Firm—J. Harold Nissen

[57] ABSTRACT

An electrical connector specifically for use in body implants where a connection may have to be varied which has on a first connector member a number of first conductors, an elastomeric connector member located above the first connector member, the elastomeric member having alternating conducting and non-conducting regions such that when it overlies the first conductors at least one conducting region is in contact with each of the first conductors and the non-conducting region is located between each pair of first conductors and a second complimentary connector member located above and secured to the first connector member, the conductors of the second connector member being in contact with the conducting regions of the elastomeric connector member and the spaces therebetween being in contact with at least the non-conducting region.

7 Claims, 3 Drawing Figures

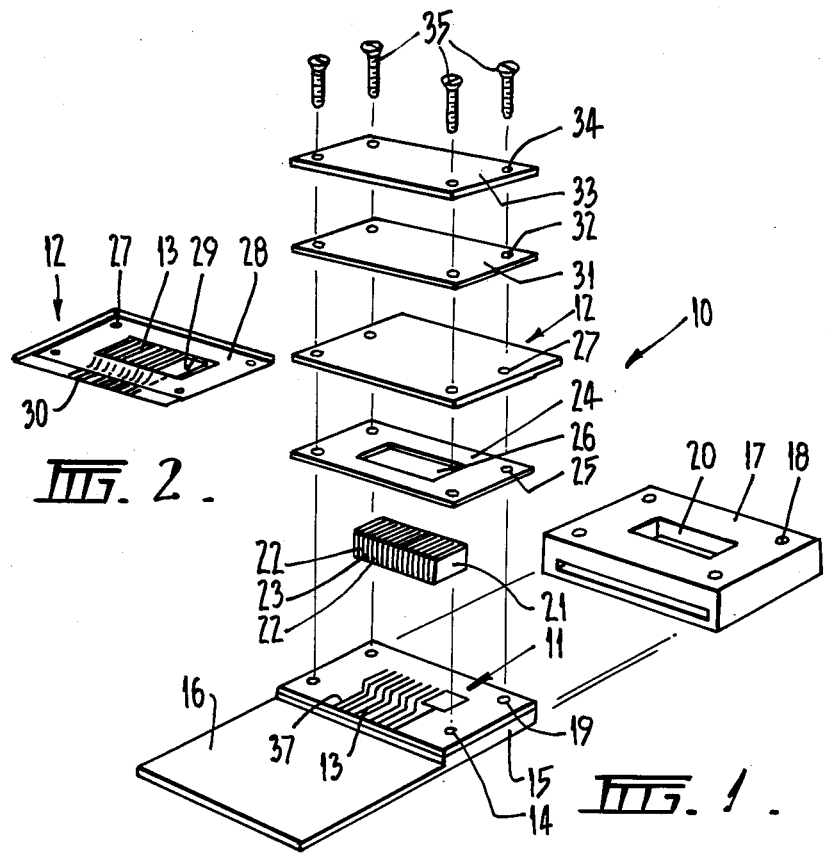
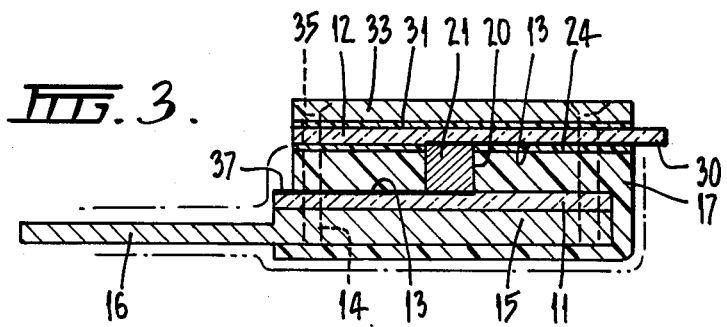

CONNECTORS AND ARTICLES HAVING CONNECTORS THEREON

This invention relates to improvements in connectors and articles having connectors thereon and is specifically designed for electronic connectors and articles including such connectors which are used in hostile environments, such as in the human body.

The connectors are specifically designed for use in high density applications such as for hearing prostheses, visual prostheses and other in vivo electronic controls, such as control of muscle functions. The invention is not, however, to be considered restricted to such functions.

The object of the invention is to provide a connector which can be used in high density applications and which is physically small, but which permits the formation of effective and durable electrical connections whilst being capable of being sealed.

The connector includes on a first connector member, a number of first conductor members, the first conductor members being located in a recess in the first connector member or its surround, an elastomeric connector member located above the first conductor members in the recess, a second connector member having a number of conductors corresponding to the number of conductors in the first connector member mounted thereon and being adapted to be located relative to the first connector member and above the elastomeric connector member so that when the second connector member is clamped onto the first connector member, or the recess in the surround, electrical sets of conductor is made between the two connector members via the elastomeric connector member.

Preferably, a metal plate or member having threaded apertures therein is located beneath the first connector member and a corresponding metal plate having apertures therein is located above the second connector member, the connector members having apertures corresponding to those of the two plates so that the members are thereby located relative one to the other.

The first and second connector member may also be on a substrate and may be coated, except where contact is to be made with the elastomeric connector, with an insulating or dielectric material. A sealing gasket is preferably located between the two substrates.

In order that the invention may be more readily understood and put into practice, we shall describe one particular form of connector, and its associated elements which is made in accordance with the invention, the connector being illustrated in the accompanying drawings, in which:

FIG. 1 is an exploded view of the connector components;

FIG. 2 is an underneath perspective of the upper connector member; and

FIG. 3 is a section through an assembled connector.

The connector may be associated with a hearing prosthesis, other prosthesis or other electronic circuitry, the electronics of which are formed on a number of substrates which are later encapsulated but the invention is not restricted to such an arrangement.

The connector 10 is based about two substrates 11 and 12 on each of which we form a number of parallel spaced conductors 13 which are preferably of gold film as by using gold film extremely thin conductors can be formed. The first or lower connector member may be on substrate 11 and the second or upper connector member may be on substrate 12.

The number of conductors depends upon the number of connections to be made and in one particular form of the invention, we provide fifteen such conductors. In this form, the conductors can be approximately 0.55 mm wide and can be spaced by 1 mm.

Located beneath the substrate 11 there is a metal plate 15 which has tapped apertures 14 therethrough. As illustrated, the plate 15 may be extended to provide a base 16 on which electronic substrates, such as those of an aural prosthesis, can be located.

The substrate 11 and the plate 15 are enclosed in a moulded plastic case 17 which is removed in the exploded view but is, in fact formed in situ. The case 17 and the substrate 11 are formed with apertures 18, 19 respectively, which apertures are in alignment with tapped apertures 14 in the plate 15.

The case 17 is also provided with a central aperture 20 through which contact can be made with the conductors 13 and ends 37 of these extend beyond the case so that terminations can be made thereon.

In order to make connection between the conductor members on the two substrates 11, 12 we provide in the aperture 20, an elastomeric connector 21.

This elastomeric connector may be of two forms. In the first, preferred, form it is a layered connector and in this the conductive 22 and non-conductive 23 zones are formed and located side by side with the conductive zones extending fully through the connector so that the connector can be cut to any required size, provided the cut is transverse to the zones whilst still having effective conducting zones.

The other form of elastomeric connector which can be used, which is not illustrated, is often cylindrical in form and has its conducting zone formed on its outer surface. These connectors can be satisfactory but it will be appreciated that it is not possible to shape these to size as the connector must be of its original shape in order to retain the conductive portions.

In one available form of layered elastomeric connector, there are some fifty conducting layers per inch, which layers have a thickness of between 0.005 inches and 0.012 inches with the insulating space therebetween being 0.008 inches to 0.015 inches.

The arrangement is such that, when compared to the width of the film conductors 13, there will always be at least one conducting layer 22 on each of the gold film conductors 13 located on the substrate and there will always be at least one insulating layer 23 between the film conductors so the elastomeric connector does not have to be truly formed at each end as it will provide a satisfactory electrical connection and insulation without such formation.

A resilient gasket 24 is located over the case 17, has apertures 25 corresponding to those of the other members and has a central aperture 26 which corresponds in shape to aperture 20 in the case 17. This gasket may be of "Teflon" (Registered Trade Mark) or may be of any other inert material.

The upper connector member 12 has an external shape basically complimentary to connector 11 such that it overlies the aperture 20 and has apertures 27 which correspond to the apertures 14 in the tapped plate.

The substrate 12 differs from substrate 11 in that it has an insulation or dielectric layer 28 leaving a recess 29 which corresponds in shape to the aperture 20 in the case 17. In this way the conductors 13 are protected except where contact is made and at their outer end 30 where they can be terminated.

The termination can either be by means of, say, soldered connection or, depending on the circumstances, by means of a plug board.

If used in an audio prosthesis the termination may be, say, fifteen electrodes soldered to the terminations.

Above the substrate 12 we may, but not necessarily, provide a further gasket 31 which may be of "Teflon" (Registered Trade Mark) or other relilient material which has apertures 32 in alignment with those in the metal plate 15.

We then provide an apertured metal plate 33, the apertures 34 of which correspond to those of the lower plate 15 which plate 33 can lie over this upper conductor member 13 and can be used to clamp the assembly by means of counter-sunk screws 35 or the like which pass through this plate, through the gasket 31, if used, the upper conductor member 12 through the case 17, the substrate 11 and into the tapped apertures 14 in the lower plate 15. The arrangement can be such that the elastomeric connector 21 does not completely occupy the central aperture but may extend thereabove, and as the upper plate 33 is screwed down, so that the upper conductor member 12 causes deformation and the elastomeric connector is caused to enter the aperture 20 and to come into electrical connection with both the connectors 11, 12. Because, as previously described, the spacing of the conducting and non-conducting portions of the elastomeric connector 21 have been selected, there will be connection only between the equivalent gold connector portions on the substrates 11, 12. Also, because of the elastomeric connector 21 and the gasket 24, a good seal is made about the edge of the recess formed by aperture 20 so no undesirable fluids can enter the connector area and cause short circuiting or other electrical faults between adjacent connector members.

If the connector is used in an implanted prosthesis, the outgoing electrode group, and the individual conductors are located in the patient's body, and where these are being used to stimulate, say, the ear, they are located to terminate adjacent the particular areas to be stimulated.

After some time, there may well be a fibrous growth around these conductor members and it would be difficult to remove these and, certainly, it would be difficult to remove them and replace them with another group of electrodes. If the prosthesis unit ceases to operate, it will be understood that it is only necessary to open the patient's skin near the point of location of this unit, undo the screws holding the upper metal plate in position and replace the prosthesis unit with a new unit using the same upper connector assembly. In this way, there is no need to disturb the location of the conductors.

I have found that the connector of the invention is extremely suitable for use where high density connections are required, and it is also of value as it enables the prosthesis or transducer assembly to be removed without the necessity of permanently displacing the electrodes or other connections. At the same time, the size of the connector of the present invention is very much smaller than has previously been obtainable so that the problem of locating a unit having a connector in accordance with the invention in a person's body is not nearly as great as has previously been the case.

Also, the connector of the present invention, is relatively easy to seal and it can be expected to have a good life, even in hostile environments.

Sealing between the substrates 11, 12 is basically by means of the gasket 24 and the resilience of the elastomeric connector 21 so that when the sandwhich is complete the prosthesis is invoilate.

It may be practical, and desirable, to seal the whole unit with "Silastic" (Registered Trade Mark) to limit physiological interference and to permit, if necessary, ready replacement.

I claim:

1. An electrical connector specifically for use in hostile environments comprising:
    a first substrate member having positioning means, said positioning means being a portion on said first substrate member located within a surround formed on said first substrate member, a number of first conductors located on said surround and surrounded thereby;
    an elastomeric connector located above said first conductors and aligned therewith;
    a second substrate member having a number of second conductors corresponding to the number of said first conductors on said first substrate member, said second conductors being located relative to said first substrate member and above said elastomeric connector so that when the second substrate member is clamped onto said first substrate member, electrical connection is made between said first conductors and said second conductors via said elastomeric connector;
    an apertured plate located above said second substrate member, and screws connecting said apertured plate with said bottom plate, the arrangement being such that when the components are correctly located said screws can pass from the upper plate, through both said substrate members and be threaded into the bottom plate; and
    said elastomeric connector including alternate conducting and non-conducting transverse layers, the thickness of said first layers and the width and spacing of said conductors of said first and second substrate members being such that there is, when said substrate members of the connector are assembled, at least part of the conducting layer between the corresponding conductors and at least one non-conducting layer between each pairs of conductors to thereby provide sealing of said conductors and said alternate conducting layers from the hostile environment.

2. A connector as claimed in claim 1, including a resilient gasket between said first and said second substrate members, said gasket having a recess corresponding to said positioning means of said first substrate member, the arrangement being such as to form a seal between said first and said second substrate members.

3. A connector as claimed in claim 2, including a second resilient gasket between said second substrate member and the plate thereabove.

4. A connector as claimed in claim 1 wherein said second substrate member has a dielectric material which leaves exposed portions of the conductors of a size of the order of the size of said positioning means.

5. An electrical connector specifically for use in hostile environments comprising:
    a first substrate member having positioning means, said positioning means forming a first surface area on said first substrate member, and the remaining surface area on said first substrate member surrounding said first surface area forms a surround;

a number of first conductors located on said surround and surrounded thereby;

an elastomeric connector located above said first conductors and aligned therewith;

a second substrate member having a number of second conductors corresponding to the number of said first conductors on said first substrate member, said second conductors being located relative to said first substrate member and above said elastomeric connector so that when the second substrate member is clamped onto said first substrate member, electrical connection is made between said first conductors and said second conductors via said elastomeric connector;

said elastomeric connector including alternate conducting and non-conducting transverse layers, the thickness of said layers and the width and spacing of said conductors of said first and second substrate members being such that there is, when said substrate members of the connector are assembled, at least part of the conducting layer between the corresponding conductors and at least one non-conducting layer between each pair of conductors to thereby provide sealing of said conductors and said alternate conducting layers from the hostile environment; and a metal bottom plate having tapped apertures and a top plate having tapped apertures, said first and said second substrate members each having tapped apertures and being positioned between said bottom metal plate and said top metal plate, respectively, a gasket having a recess therein corresponding to said positioning means, said gasket being located between said first and said second substrate members, and said second substrate member has a dielectric material which leaves exposed portions of the conductors of a size of the order of the size of said positioning means.

6. A connector as claimed in claim 1 or 5 wherein said positioning means is a recessed portion provided in said first substrate member.

7. A connector as claimed in claim 6 including a metal plate with tapped apertures, said first substrate being located on said metal plate, and screws being receivable within said tapped apertures whereby clamping is achieved.

* * * * *